Feb. 20, 1940.   R. W. MITCHELL   2,191,025
METHOD OF MAKING COMPOSITE PIPES
Filed April 27, 1936   3 Sheets-Sheet 1
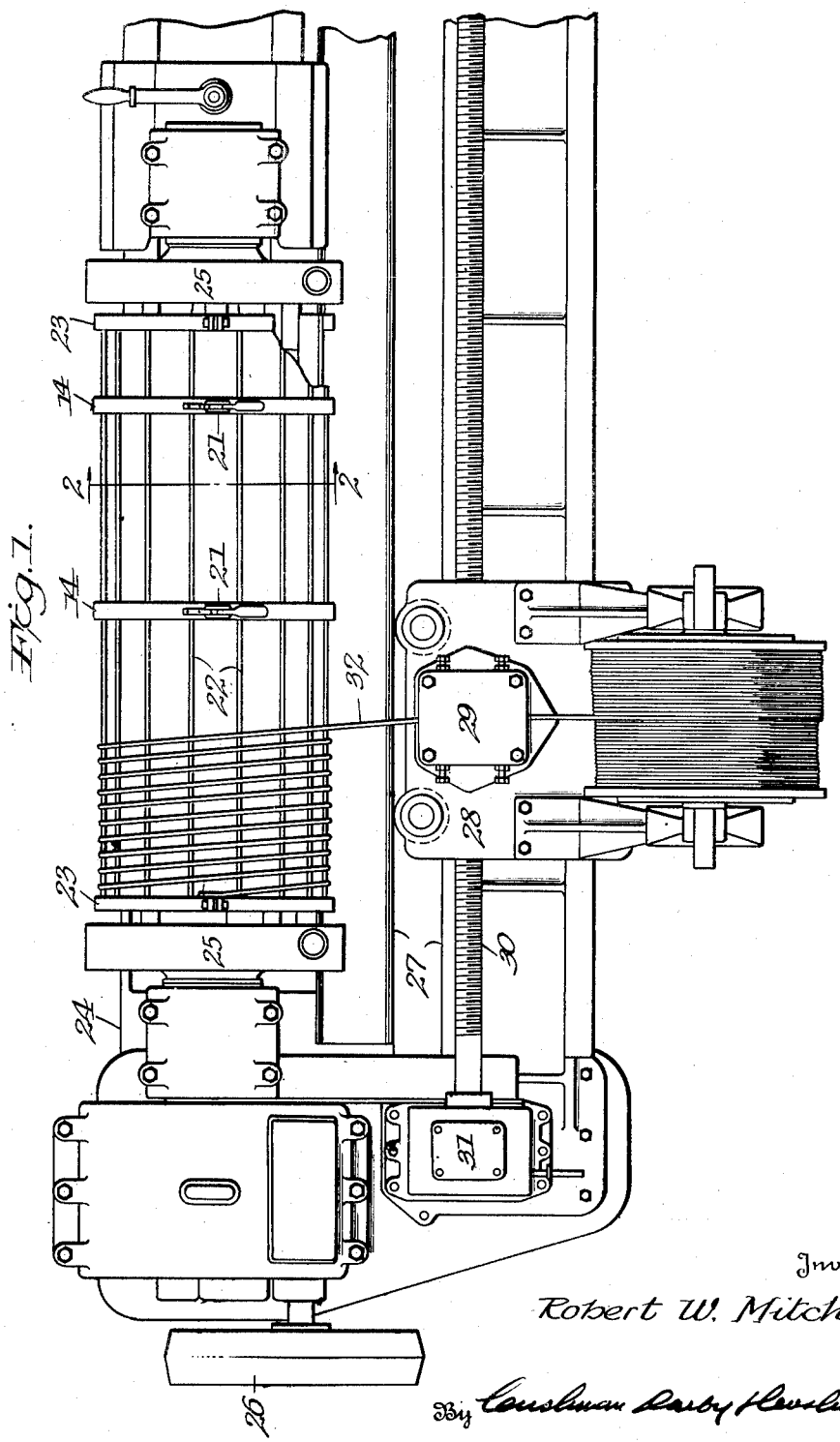
Inventor
Robert W. Mitchell
By Cushman Darby Cushman
Attorney Feb. 20, 1940. R. W. MITCHELL 2,191,025
METHOD OF MAKING COMPOSITE PIPES
Filed April 27, 1936 3 Sheets-Sheet 2
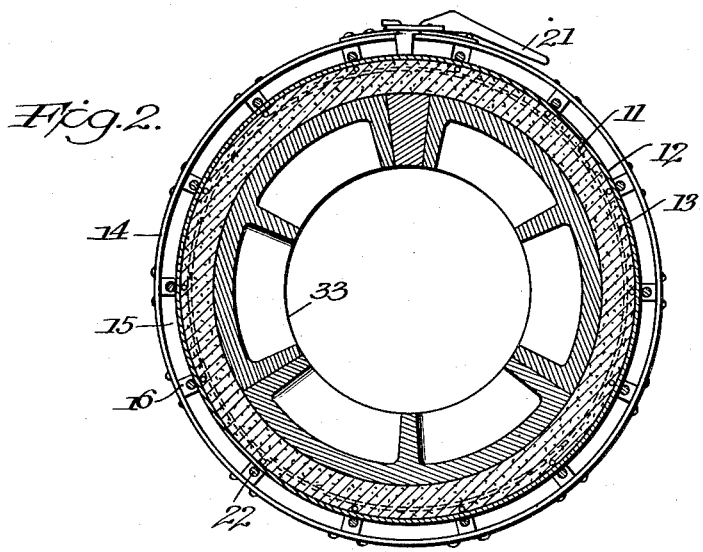
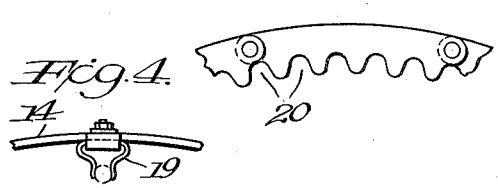
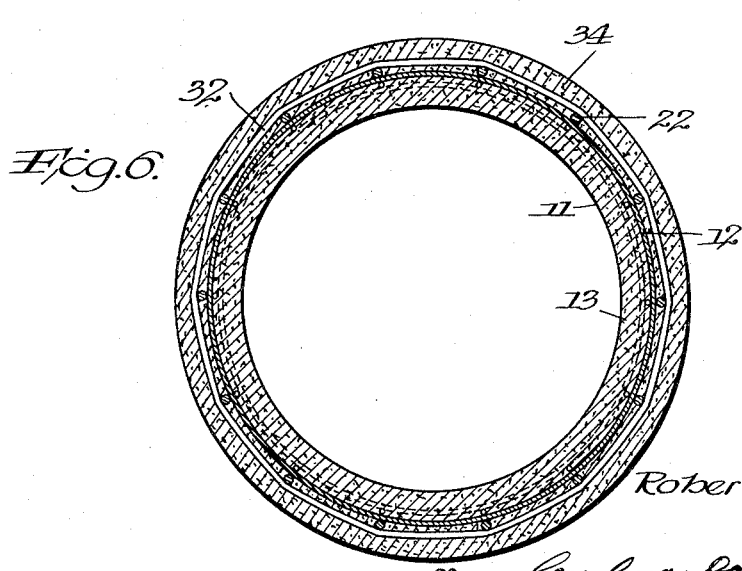
Inventor
Robert W. Mitchell
By Cushman Darby Cushman
Attorney Patented Feb. 20, 1940

2,191,025

UNITED STATES PATENT OFFICE 2,191,025

METHOD OF MAKING COMPOSITE PIPES

Robert W. Mitchell, Westmount, Quebec, Canada

Application April 27, 1936, Serial No. 76,693
In Canada December 22, 1934

2 Claims. (Cl. 25—154)

This invention relates to a method of making composite pipes, poles, columns, piles, caissons and the like which include longitudinal and circumferential metal reinforcing members, and is a continuation in part of application Serial No. 759,126, filed December 24, 1934.

In the manufacture of reinforced concrete pipes and the like, especially those of large size, a considerable part of the labour cost is incurred in assembling and connecting together with various members of the metal reinforcement.

The primary object of this invention is to provide a method of and apparatus for making composite pipes, and the like, according to which the reinforcement may be very easily and quickly put in place and the members securely held in proper relative positions without the use of clips, ties, welding or brazing at the intersections of the members. Various other objects and the advantages of the invention may be ascertained from the following description.

According to this invention, a cylindrical core of any suitable character, is first formed according to any suitable method and may be, for example, a sheet metal cylinder with or without a lining of concrete or may be a concrete cylinder, with or without embedded reinforcement. Longitudinal reinforcing rods or bars are mounted on the core and temporarily secured in place by releasable bands having rod positioning means thereon. The core with the longitudinal rods and releasable bands is mounted for rotation about its axis. A wire is secured to one end of the core which is then rotated and the wire guided and controlled so that it is found helically in tension upon the core and rods, outside the latter. As the winding approaches each band, the same is released and thrown off. When the winding is complete, the wire is secured to the end of the core so as to maintain the tension. The structure is then coated with cementitious material either by plastering the same on or by placing the structure in a mould and filling the annular space between the structure and mould with concrete or other suitable material, care being taken that the material enters between the helices of the wire and the core so as to be bonded to the core.

In the accompanying drawings which illustrate one manner of, and one form of apparatus suitable for, carrying out the method of this invention, but to the details of which the invention is not of necessity confined;

Fig. 1 is a plan view showing a pipe in process of formation in suitable apparatus.

Fig. 2 is a cross-sectional view of the core on the line 2—2 of Figure 1 and shows the temporary filler and reinforcement holder.

Figs. 3, 4 and 5 are fragmentary views on an enlarged scale relatively to Figure 2, showing modified forms of rod holding means.

Fig. 6 is a cross-sectional view of a completed pipe.

Figure 7:
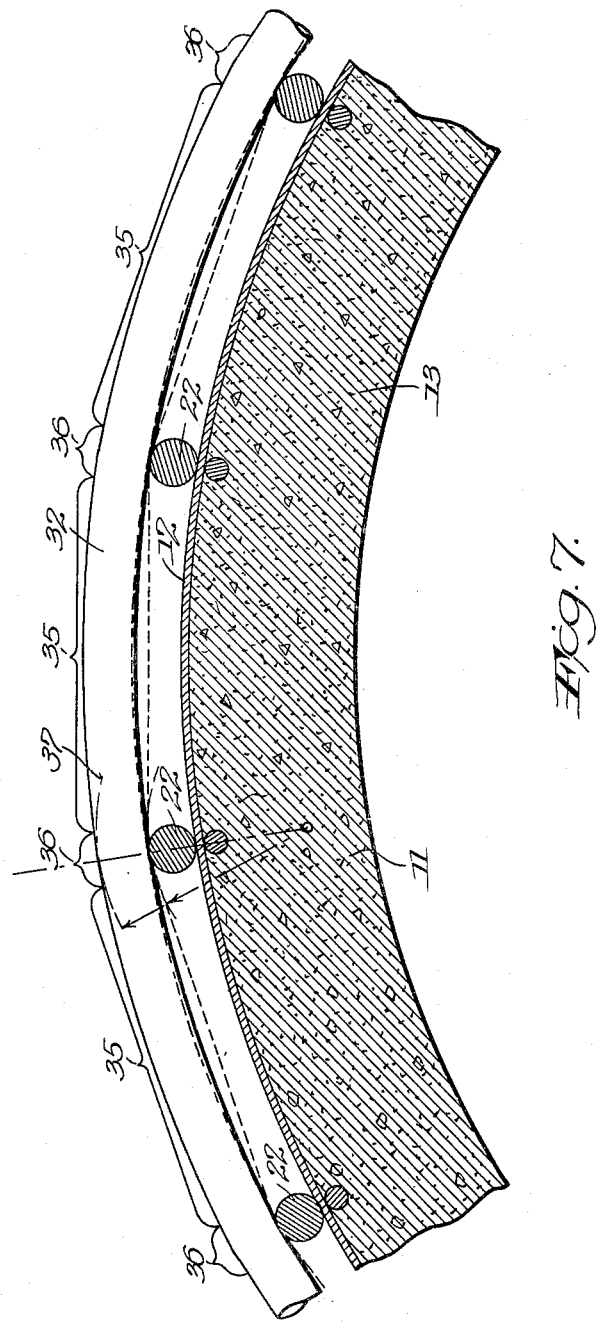
Fig. 7 is a fragmentary cross-sectional view similar to Fig. 6, but on an enlarged scale, illustrating inward displacement and curvature of circumferential reinforcement due to tension in the same.

Referring more particularly to the drawings, 11 designates the core or inner part of a pipe which may consist merely of a sheet metal cylinder 12 or merely of a concrete cylinder 13 or of the two assembled with the metal cylinder outermost as shown. This core is first made according to any suitable design and method.

A plurality of bands 14 of heavy textile fabric, leather, metal chain or other suitable flexible material, are provided on one side with reinforcing rod holders which may be mounted in fixed or adjustable relation to the bands. These holders may be simple spaced blocks 15 of suitable length as shown in Figure 2 and composed of wood or other suitable material, the spacing between the blocks being such as to provide pockets 16 of proper size to receive reinforcing rods and hold the same against accidental movement. Alternatively, the block 17 may be grooved on the surface remote from the band, as shown at 18 in Figure 3, to receive the reinforcing rods. As a further alternative, spring metal clips 19 (Figure 4) may be secured to the bands. If the bands are chains, the rod receiving grooves may be formed in the links of the chain, as shown at 20 in Figure 5. The bands are of length suitable to encircle the core and are provided at their ends with quick release fastening means 21 such as lever clasps.

A suitable number of bands 14 are clasped around the core with the rod pockets next the core and the pockets of the several bands in alignment parallel with the axis of the core. Reinforcing rods 22 are passed lengthwise through the pockets and are thus held in proper spacing and parallelism with relation to the core. Alternatively, the bands may be laid in parallelism on a suitable working surface, with the rod pockets uppermost, and the rods 22 laid in pockets. The grille thus formed may be then wrapped around the core and secured by the fasteners 21. The extreme ends of the core are temporarily reinforced by metal hoops 23, clamped tightly around the core, these hoops serving also to hold the bars 22 against displacement in their longitudinal direction.

The core with the rods 22 and hoops 23 attached thereto is mounted for rotation in any suitable winding machine.

A machine which has been found suitable comprises a base 24 carrying a pair of spaced, axially aligned, rotatable expanding chucks 25 which engage the ends of the core internally thereof, the core being held by the hoops 23 against being burst by the outward pressure of the chucks when the same are expanded to grip the core. Driving means 26 are connected to one of the chucks. A track 27 is provided parallel with the axis of the chucks and supports a carriage 28 on which is mounted a reel of wire and a wire straightening and tensioning device 29. The carriage is moved by any suitable means, such as a worm 30 held against longitudinal movement and operatively engaging the carriage and driven from the chuck driving means 26 by means including any suitable variable speed driving means 31.

Wire 32 to form the circumferential reinforcement of the pipe is led from the reel through the adjustable tensioning device 29 and is secured to one end of the core. The machine is then started to rotate the core and to move the carriage along the core at a rate suitably proportioned to the lineal speed of rotation of the core, so that the wire is wound in a helix about the core and longitudinal rods 22 under tension determined by the adjustment of the device 29. As the winding approaches each band 14, the operator unclasps the band and throws it off the core, so that the winding continues without interruption either in time or continuity of wire. When the core is fully wound, the wire is secured to the core near the end thereof, while the wire is still in tension, so that when the reinforced core is removed from the machine the tension in the winding will be maintained and the rods 22 will be immovably clamped against the outer surface of the core and will also serve to space the winding away from the core.

If the core consists merely of a thin sheet metal shell or is otherwise so light as to be liable to strain by the severe stresses incident to winding on the wire, any suitable removable supporting means, such as a sectional form 33 (Figure 2), may be inserted in the core prior to mounting the core in the winding machine.

The wire may be wound either hot or cold, the latter being preferred as it is easier and less expensive and yet enables the wire to be adequately tensioned. Care should be taken that the tension is not such as to draw the wire straight between the rods, as this would so reduce the gap between the wire and core as to prevent proper penetration and bonding of a cementitious covering. The tension is such (see Figure 7) as will draw the portions 35 of wire between the rods inward from a position of parallelism with the outer surface of the core, so that the wire has curvature of radius greater than the core, and at the same time effect a bending of the portions 36 of wire where it crosses the rods to curvatures of radii greater than the diameter of the rods but less than the radius of the core as indicated in Figure 7 by continuation of the arc of curvature in the portion 36 as shown at 37. The bending of the wire over the rods causes the wire to form shallow rod retaining pockets which, combined with the binding effect of the tensioned wire, clamp the rods immovably in position against the core.

The diameter of the rods depends largely upon the provision of sufficient space for the outer cement covering to key adequately under the winding wire. The spacing of the rods depends upon the desired girder strength in the pipe and depends also upon the diameter of the pipe to the extent that a straight line tangent to adjacent rods at approximately the points of contact with the winding wire must be spaced outwardly from the outer surface of the core as shown in Fig. 7. The spacing of the winding wire must obviously be not less than will permit adequate keying of the cement covering between the turns of wire and the diameter of wire depends on the number of turns and the internal load to be sustained.

The inward displacement of the wire from parallelism with the surface of the core is a measure or indication of the tension in the wire. An inward displacement of the wire through from 20% to 50% and preferably through approximately 30% of the distance from parallelism with the surface of the core to a straight line position between adjacent longitudinal rods indicates a proper degree of tension to develop the desired stress in the wire in any pipe in which the size and number of turns of wire and the size and spacing of the longitudinal rods are properly adjusted to the diameter of the pipe and the internal pressure to be sustained. According to this invention the wire is tensioned to produce the aforesaid inward displacement thereof which displacement is therefore a convenient indication of proper tension to develop the desired stress in the wire.

When the winding is complete, the reinforced core is taken out of the machine and the hoops 23 are removed.

An outer covering 34 of cementitious material, such as cement concrete, is applied to the reinforced core, either by plastering on the covering material while in plastic state or by inserting the reinforced core in a mould and filling the annular space between the core and mould with the plastic covering material and allowing the material to set, care being taken in either case that the cementitious material penetrates between the winding and the core, so as to be firmly bonded to the core.

While helical winding of wire about the core and rods is the preferred method of manufacture, it will be understood the inventin also contemplates the alternative step of securing a series of separate hoops in tension around the core and rods, the temporary bands being removed as the work progresses.

A great advantage of the invention is that it enables the circumferential and longitudinal reinforcing of a pipe to be very accurately, quickly, easily and inexpensively produced while avoiding the use of welds or clips at the intersections of the members. The method produces a rigid reinforcement in which the members are immovable relatively to one another, so that the structure can be handled without special care, and the members do not become displaced by vibration during the application and consolidation of concrete covering. The reinforcement is better balanced for spinning to place and consolidate concrete linings. The tensions of the circumferential reinforcement is adequately developed.

Having thus described, my invention, what I claim is:

1. A method of making composite pipes and the like which comprises forming a core, arranging a series of reinforcing rods in parallelism on temporary and removable holding means therefor and wrapping the temporary holding means around the core whereby the rods are disposed and held in parallelism with the core axis and held against the core, fastening winding wire to one end of the core and rotating the core while so guiding and tensioning the wire that it winds in a helix about the core and rods, removing the temporary holding means as the winding approaches the same, fastening the wire to the other end of the core while maintaining the wire in tension, thereby to permanently and immovably clamp the rods to the core, and applying an outer covering to the wound core in suchwise that the covering material penetrates into the spaces between the winding wire and the core with covering securing effect.

2. A method of making composite pipes and the like which comprises forming a core, positioning reinforcing rods in contact with the outer surface of said core longitudinally thereof and temporarily holding the rods as positioned at intervals in the length of the core by means of removable holding members encircling the core and rods, fastening winding wire to one end of the core and rotating the core while so guiding and tensioning the wire that it winds in a helix about the core and rods and is inwardly displaced between adjacent rods through 20% to 50% of the distance from parallelism with the surface of the core to straight line between adjacent rods at approximately the points of contact of the wire therewith, and removing the removable holding members one at a time as the winding approaches the same, fastening the wire to the other end of the core while maintaining the wire in tension thereby to permanently and immovably clamp the rods to the core in the position of their initial arrangement, and applying an outer covering to the wound core in such wise that the covering material penetrates into the spaces between the winding wire and the core with cover securing effect.

ROBERT W. MITCHELL.